(12) United States Patent
Cordina et al.

(10) Patent No.: US 7,188,292 B2
(45) Date of Patent: Mar. 6, 2007

(54) DATA MIRRORING SYSTEM

(75) Inventors: Kevin Cordina, Sawbridgeworth (GB); John Courtney, Greenisland (GB); Mark Carson, Belfast (GB)

(73) Assignee: Nortel Networks Limited, St. Laurent (CA)

( * ) Notice: Subject to any disclaimer, the term of this patent is extended or adjusted under 35 U.S.C. 154(b) by 416 days.

(21) Appl. No.: 10/672,711

(22) Filed: Sep. 26, 2003

(65) Prior Publication Data
US 2005/0071527 A1   Mar. 31, 2005

(51) Int. Cl.
*H04J 6/00* (2006.01)
*G06F 11/14* (2006.01)

(52) U.S. Cl. .................. 714/748; 714/18; 714/749; 710/33; 710/52

(58) Field of Classification Search ................ 714/748, 714/18, 749; 370/428, 420, 229, 329; 711/114, 711/111, 158; 710/52, 29–35
See application file for complete search history.

(56) References Cited

U.S. PATENT DOCUMENTS

| 4,082,922 | A | * | 4/1978 | Chu ........................... 370/230 |
| 5,537,533 | A | | 7/1996 | Staheli et al. |
| 5,727,002 | A | * | 3/1998 | Miller et al. ................. 714/748 |
| 5,764,903 | A | | 6/1998 | Yu |
| 5,968,197 | A | * | 10/1999 | Doiron ........................ 714/748 |
| 6,098,119 | A | | 8/2000 | Surugucchi et al. |
| 6,330,642 | B1 | | 12/2001 | Carteau |
| 6,470,391 | B2 | * | 10/2002 | Takamoto et al. ........... 709/227 |
| 6,502,205 | B1 | | 12/2002 | Yanai et al. |
| 6,615,383 | B1 | * | 9/2003 | Talluri et al. ................ 714/749 |
| 2001/0021984 | A1 | * | 9/2001 | Kim ............................. 714/18 |
| 2003/0093638 | A1 | | 5/2003 | Margerie et al. |

FOREIGN PATENT DOCUMENTS

EP   1 128 267 A   8/2001

* cited by examiner

*Primary Examiner*—Christopher Shin
(74) *Attorney, Agent, or Firm*—Barnes and Thornburg LLP

(57) ABSTRACT

Hitless Switching provides a method of delivering data to a remote point in a reliable fashion. However, no guarantee or acknowledgement is provided that data has been written to a remote storage device. This is problematic for remote data mirroring. Apparatus and methods are provided to guarantee that data arriving at a remote terminal is correctly stored. Interaction with hitless switching and remote optical mirroring systems are described.

27 Claims, 6 Drawing Sheets

DATA MIRRORING SYSTEM

FIELD OF THE INVENTION

This invention relates to a remote storage site for a system employing remote data mirroring.

BACKGROUND TO THE INVENTION

Enterprises have a requirement for reliable storage of their data. Some enterprises rely on periodic (e.g. nightly) backups of their data, with a copy of the data being stored locally or off-site. Other enterprises, particularly financial institutions, have a more stringent requirement for reliable data storage and employ a network which has a primary storage system, for storing data, and a second storage system at a location which is geographically remote from the primary storage system. The storage systems regularly communicate with one another across the network, with the second storage system maintaining an exact copy of the data that is stored on the primary storage system. This process of copying data to the second storage system is often called data mirroring. Usually, the distance between the primary and second storage systems is sufficiently great to survive a typical 'disaster scenario', often 50 km or more.

There are several known ways of achieving data mirroring. A first way, known as synchronous mirroring, ensures that the data on the second storage system is, at all times, exactly in step with the data on the primary storage system. This is best described with reference to FIG. 1. A computer system 10 is connected to a primary storage system 11 and, by way of a communication link 12, to a second storage system 13. An instruction to write data (A) is sent to the primary storage system 11. The primary storage system 11 writes the data (B) to a storage device 14 and sends an instruction to write the same data (C) over link 12 to the second storage system 13. As soon as the instruction to write is received, or upon completion of the write operation (D) at the second storage system, an acknowledgement signal (E) is sent from the second storage system 13 to the primary storage system 11, which is returned (F) to the computer system 10. No further instructions to write data are issued by computer system 10 until the acknowledgement signal (F) is received. While this ensures that the primary and second storage systems are always exactly in step with one another, the need to wait for an acknowledgement on each occasion has the disadvantage that the throughput of data can be slow. This is particularly so where the primary and second storage systems are separated by a great distance, e.g. 5000 km, as the propagation of signals across communication link 12 incurs a significant delay. Enterprises which have business sites in different parts of a country, or in different countries or continents, may have the primary storage system at one of their sites and the second storage system at a second of their sites. The delay associated with waiting for acknowledgements is known as latency.

In view of the problems with synchronous mirroring, in a second way of data mirroring, known as asynchronous mirroring, the primary and second storage devices are allowed to be out of step with one another. Referring again to FIG. 1, the computer system 10 sends a write instruction to the primary storage system 11 but does not wait for an acknowledgement from the second storage system 13 before issuing the next write instruction. While this has the advantage of achieving a higher throughput of data, many financial institutions are understandably nervous that operating in this manner could result in them missing details of a vital transaction. If the primary storage system were to fail, the second storage system would be left in an inconsistent and unknown state, potentially costing the institution significant amounts of money, time and reputation.

A method of providing exceptionally reliable transmission of data is known as hitless switching (Described in co-pending U.S. application Ser. Nos. 09/862,864 and 10/154,173, incorporated herein by reference). Hitless switching can be used to, effectively, guarantee the arrival of data at a reception end of an optical transmission system. This can be utilised to extend the reach of synchronous mirroring systems by removing the time delays associated with the transport of acknowledgements over very long distances. This is described in co-pending U.S. application Ser. No. 10/460,285, incorporated herein by reference.

FIG. 2 shows a network utilising hitless switching to provide remote synchronous optical mirroring.

The primary storage system 11 and second storage system 13 are connected to one another by a communication link 20, 21. Transmission equipment 22 connects the primary storage system 11 to the near end of the communication link 20, 21 and transmission equipment 23 connects the second storage system 13 to the far end of the communication link 20, 21. The communication link comprises a first transmission link 20 and a second transmission link 21. The first and second transmission links 20, 21 are routed along physically diverse paths to provide protection against failures in transmission equipment or cables along one of the paths. One possible failure condition is that transmission cables can be accidentally or maliciously cut. The length X of the links can be a considerable distance, such as 5000 km or more. In use, the same data is transmitted over both of the first and second links 20, 21. While the transmission paths 20, 21 are shown as simple direct paths they will, in reality, comprise a series of connections between network nodes such as multiplexers, cross-connects, signal regenerators and other signal processing or switching apparatus. Due to the different routing that paths 20, 21 take, one of the paths will almost certainly be longer than the other.

The control apparatus 24 which implements the function of copying data from the primary storage system 11 to the secondary storage system 13 resides on the primary storage system 11. It receives requests to write data from the host 10, issues write instructions to the second storage system 13 and returns acknowledgements to the host 10 when certain conditions are met.

FIG. 3 shows a form of the transmission apparatus 22 which can be used at the first end of the communication link 20, 21. It comprises a storage buffer 30 for holding a write instruction, transmission formatting equipment 31, 32 for converting the write instruction into an appropriate format for transmission over the links 20, 21 and a control apparatus 33. In the case of an SDH/SONET transmission link, the formatting equipment will format the write instruction into an SDH frame and generate a signal with an appropriate linecode and physical format for transmission over the links 20, 21. In an SDH network, traffic is normally carried in a Synchronous Transmission Module (STM). An STM can support one or more transmission paths depending on the capacity of the STM (STM-1, STM-4, STM-16 and STM-64) and on the data signal carried by the path. The data signal can carry data in data structures, or Virtual Containers (VCs), of differing sizes, such as the VC-4 or VC-12. Each path has an associated path overhead (POH) which enables the network equipment to monitor the transmission of the data signal across the whole path and to perform, for example, quality and error checks. Similarly, for a packet or cell-based transmission format, the formatting equipment 31, 32 will load the write instructions into the payload of a packet and insert appropriate data into the header fields of the packet so as to route the packets across the transmission links 20, 21. These details are well-known to one of ordinary skill in the art. A control apparatus 33 supervises the operation of the equipment. Each write instruction sent by the primary storage system 11 is received by the control apparatus 33 and then inserted into the buffer 30.

The operation of the network will now be described with reference to FIGS. 2 and 3. In operation, the primary host 10 transmits a write request (A) over link 25 to the primary storage system 11, i.e. a request to write a block of data. The control apparatus 24 performs the write operation (B) to the storage devices 14 and, to achieve data mirroring, sends a write request (C), and the appropriate block of data which is to be written, to the transmission equipment 22. This combination of a write request and a block of data to be written will hereafter be called a write instruction. It should be noted that there may be a considerable quantity of data accompanying the write request. The write instruction is held in the transmit buffer 30 of transmission equipment 22 before being launched (D) onto each of the pair of transmission links 20, 21. Control apparatus 33 monitors the status of the buffer 30 and returns an acknowledgement signal (E) to the control apparatus 24 of the primary storage system 11 when the write instruction has been sent from the buffer 30. In this manner, the primary storage system 11, and the host 10, receive an acknowledgement when the write instruction has been sent onto the transmission links 20, 21. Since the transmission over links 20, 21 can be assumed to be secure, the processor 26 in the host 10 can proceed to the next write request.

At the far end transmission equipment 23, two versions of the write instruction will be received, offset from one another by a time period which is due to the different lengths of the transmission paths 20, 21 and the network equipment located along those paths. The two received signals are aligned with one another so that the transmission equipment can select between them without incurring a 'hit' on the content, i.e. without duplication or omission of parts of the signal. This is described in co-pending U.S. application Ser. Nos. 09/862,864 and 10/154,173 incorporated herein by reference). Thus, transmission equipment 23 outputs (G) a write instruction constructed from the two received signals. Control apparatus 27 receives the write request and performs a write operation to the storage devices 28.

Hitless switching provides a method of delivering data to a remote point in a highly reliable fashion. However, there is no guarantee or acknowledgement provided that the data has been correctly written to the remote storage device. This is clearly highly undesirable in a remote mirroring situation, in which a guarantee that data has been correctly stored is required.

SUMMARY OF THE INVENTION

According to a first aspect of the present invention, there is provided apparatus for ensuring data received from a data transmission network is stored on a storage device without the introduction of any errors, the apparatus comprising
  a buffer; and
  a controller connected to a storage device and the buffer,
wherein the data is stored in the buffer before and after transmission of the data to the storage device, and wherein the data is deleted from the buffer only after a write confirmation message is received from the storage device at the controller.

This apparatus enables the synchronous mirroring of data over very long distances. Conventional mirroring systems require the acknowledgement of every frame before further data is transmitted, thus introducing significant latency to the mirroring process.

The data transmission network may comprise links with a low bit error rate, diversely routed optical paths or comprise an acknowledgement free link. This has the advantage of providing a transmission system which effectively guarantees the correct delivery of data to the remote storage site.

The storage device may be located at a remote site from the buffer. Physically separating the buffer and storage device reduce the likelihood that both parts of the system will be affected by a common failure, for example a natural disaster.

The data in the buffer may be re-transmitted to the storage device from the buffer in response to a retransmission request from the storage device. This has the advantage that if an error occurs during the storage of the data, anther attempt to store the data is made, thus increasing the likelihood that the data will be stored correctly. The data is not deleted from the buffer until it has been stored correctly, and thus a correct record of the data is always available—either in the buffer or on the storage device.

The buffer may store an ID number with the data being stored in the buffer. The ID number may be transmitted to the storage device, used to identify data to delete from the buffer or used to identify data to be retransmitted from the buffer. This enables segments of data to be tracked in the buffer and storage device. This also removes the need for the buffer to operate in a first-in-first-out configuration as is required if no ID system is utilized.

Two buffers, controllers and separate storage devices may be utilized, to further improve the quality of the data mirroring. The sets of equipment may be located may be geographically separated such that there is no common point of failure.

A communications link may be provided between the first and second controllers to enable communication of write acknowledgements and failures, and to transmit data between the sites in the event of data being lost at one site.

In a further aspect of the present invention, there is provided a method for ensuring data received from a data transmission network is stored on a storage device without the introduction of any errors, comprising the steps of
  storing the data in a buffer,
  transmitting the data to a storage device,
  writing the data to the storage device, and
  deleting the data from the buffer in response to a write confirmation message from the storage device.

Further, data may be retransmitted in response to a retransmission request from the storage device.

This method has the advantages that it enables the data to be correctly stored on a storage device. Data is not deleted from the buffer until the write is confirmed, and hence there is always a record of the correct data, either in the buffer or on the storage device.

An ID number may be stored in the buffer with the data, may be transmitted to the storage device, and may be utilized to identify data to be retransmitted or deleted from the buffer.

This method has the advantage that it enables segments of the data to be identified, which means the buffer does not have to work according to the first-in first-out principle, as is required if no numbering scheme is utilized.

In the event of a system failure or problem, a signal may be sent to the data transmission network to stop sending data. This enables the remote storage system to notify the transmission system that there is an issue, but does not introduce latency when the system is operating correctly.

A message may be sent from a first storage device, which has stored the data correctly, to a second storage device, to indicate the data has been stored correctly, that the write has failed or that the data has been lost. Data may be sent from a storage device which has not lost the data, to a storage device that has lost the data.

This ensures that even if one storage system has a failure whereby data is lost, the correct data can be obtained and stored, and thus no errors are introduced.

In a further aspect of the present invention there is provided a data mirroring system comprising
   a primary data storage site,
   an acknowledgement free transmission system,
   a remote data storage site comprising a buffer and a storage device,
wherein data is transmitted from the primary data storage site to be replicated on the remote storage site, wherein the primary data storage site does not wait for an acknowledgement before sending further data.

The key advantage of this data mirroring system is that no latency is introduced to the mirroring system by waiting for acknowledgements. This allows synchronous data mirroring to be carried out over substantially longer distances than is possible with conventional mirroring systems.

The remote storage site may notify the primary storage site when a problem occurs, such that the primary storage site can send data to an alternative storage site.

This ensures that data is never lost, and that a remote storage site is always available, without introducing the latency associated with the acknowledgement of every data frame.

There is provided a method of operating a data mirroring system, comprising the steps of
   transmitting from a transmitter to a receiver,
   writing the data to a storage device,
   sending further data without waiting for an acknowledgement signal,
   sending a warning message from the receiver to the transmitter if the remote storage site malfunctions.

The primary storage site may transmit data to an alternative remote storage site after receiving a warning from a remote storage site.

This method enable the synchronous mirroring over very long distances, without introducing the latency associated with acknowledgement of every data frame, as is required in conventional mirroring systems.

There now follows, by way of example only, a detailed description of preferred embodiments of the present invention in which:

DESCRIPTION OF PREFERRED EMBODIMENTS

The present invention provides apparatus and methods to guarantee that data arriving at a remote terminal is correctly stored, and provides methods for the interaction with hitless switching and remote optical mirroring systems to provide improved remote optical mirroring over long distances.

Figure 1:
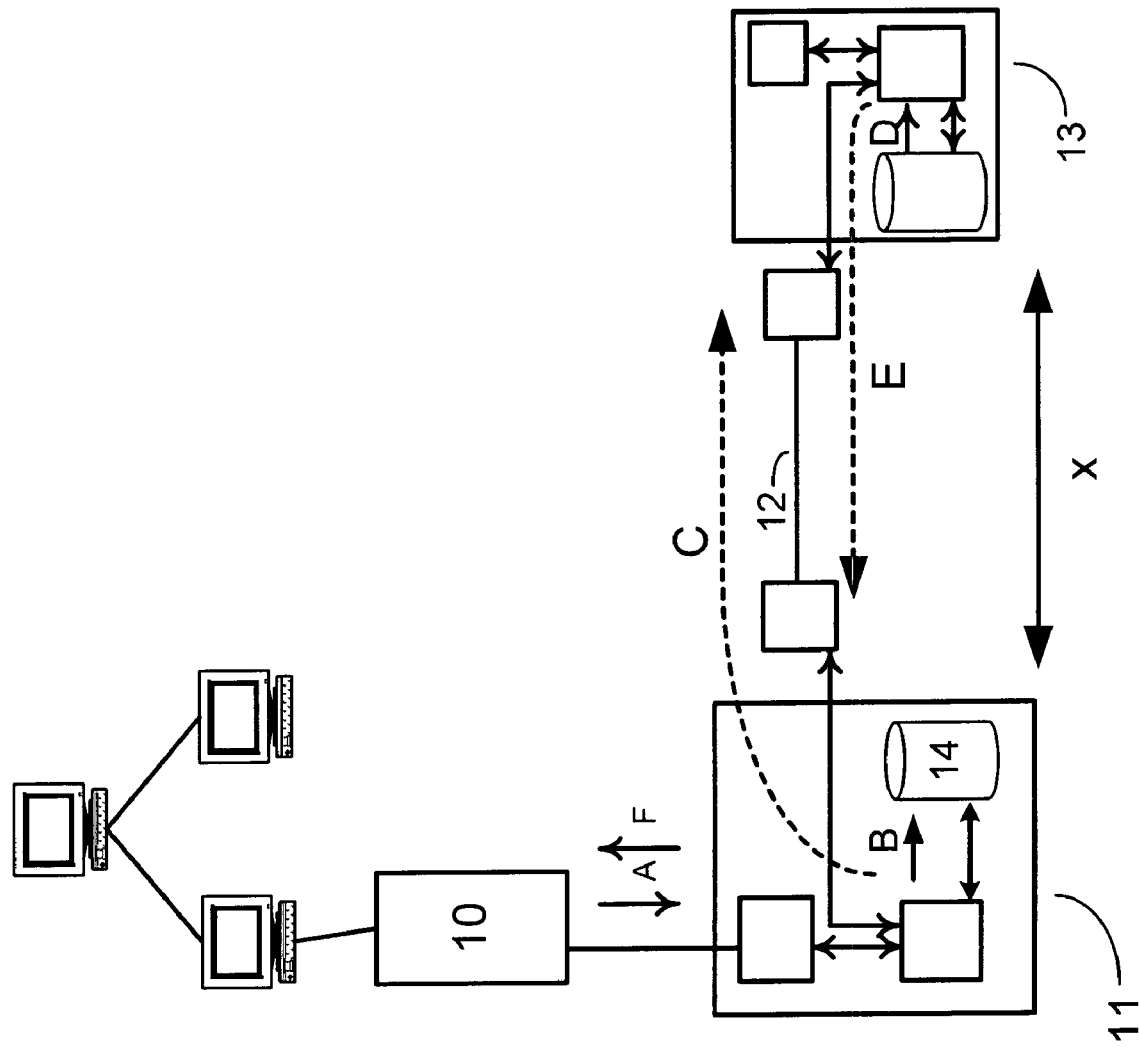
FIG. 1 is a block diagram of a data mirroring system as known in the prior art.
Figure 2:
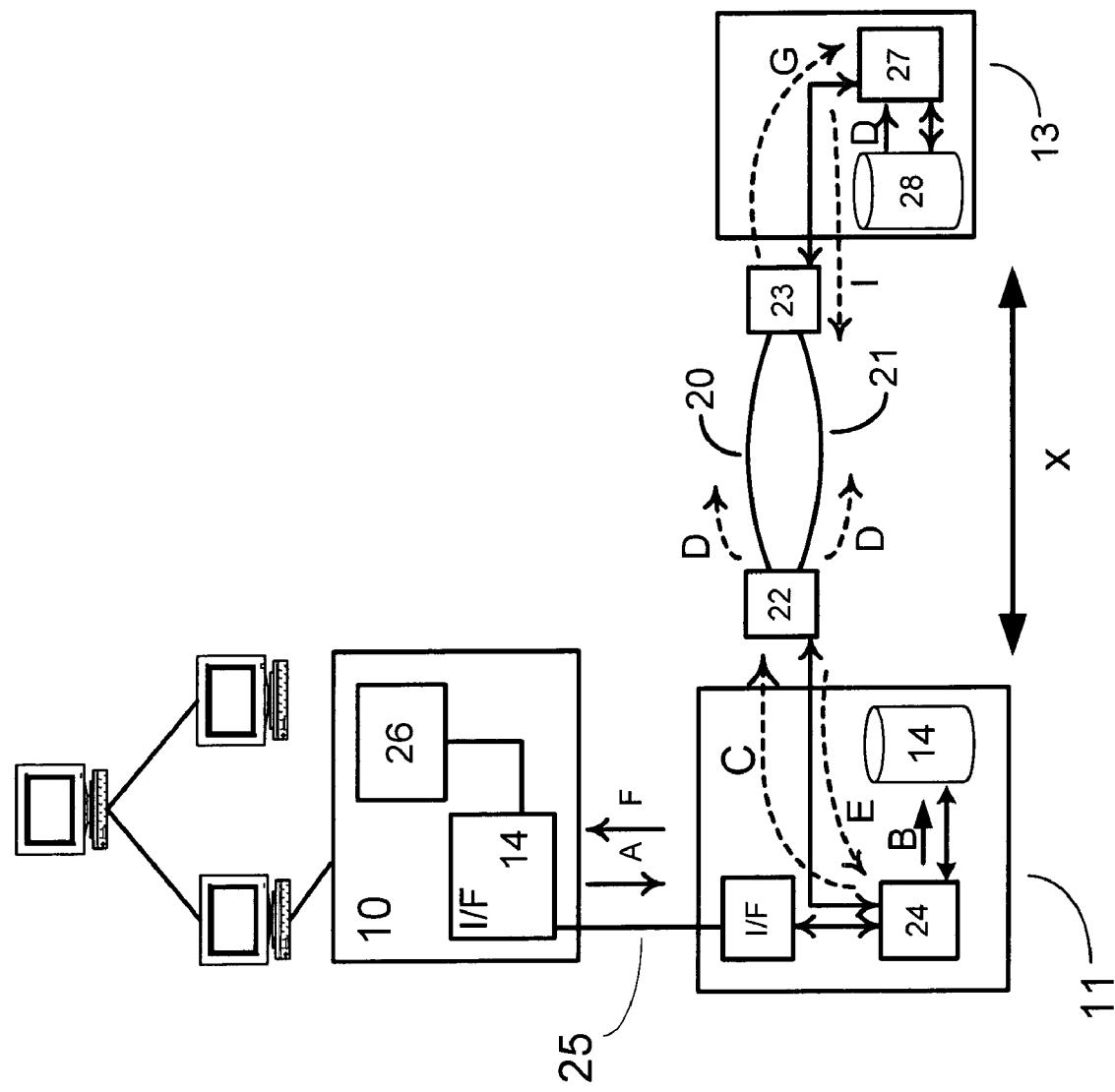
FIG. 2 is a block diagram of a data mirroring system employing hitless switching, as known in the prior art.
Figure 3:
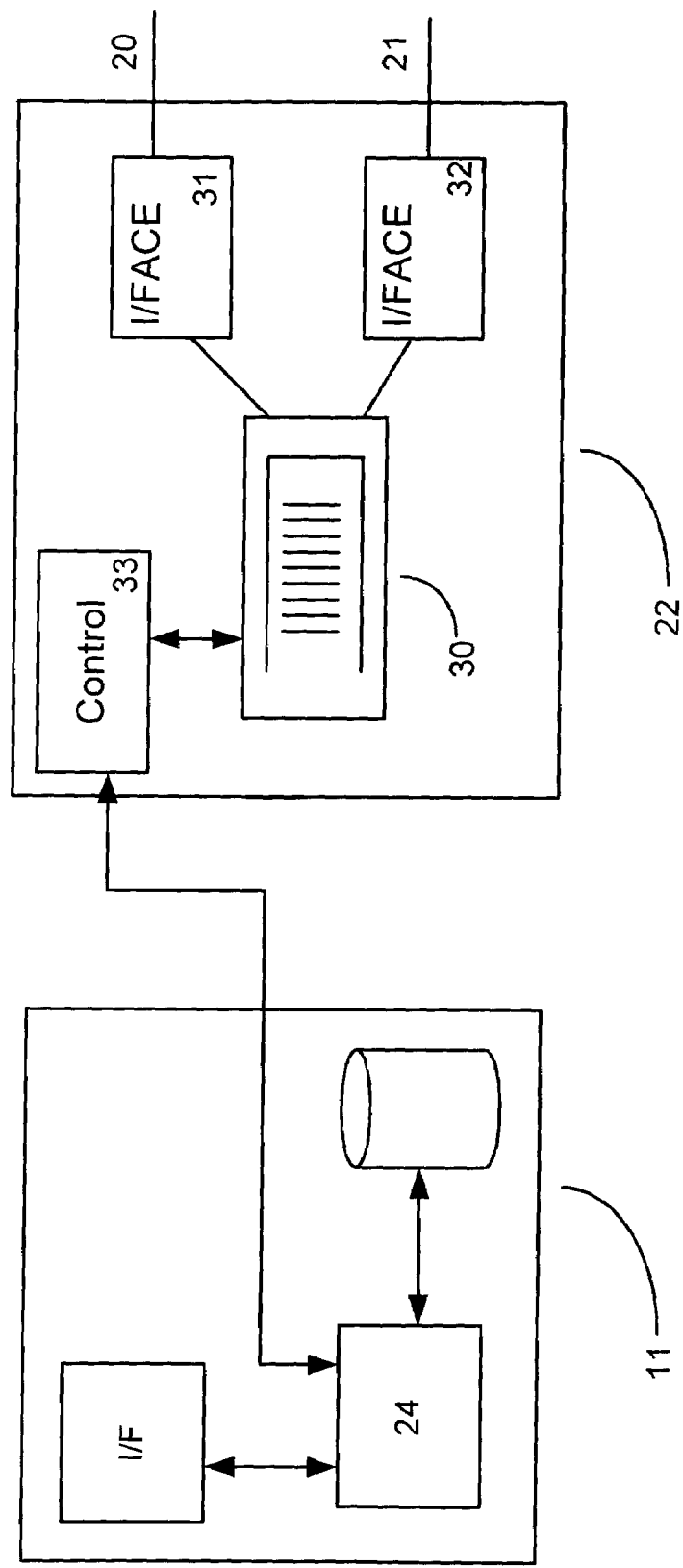
FIG. 3 is a block diagram of the primary storage system end of a hitless switched mirroring system, as known in the prior art.
Figure 4:
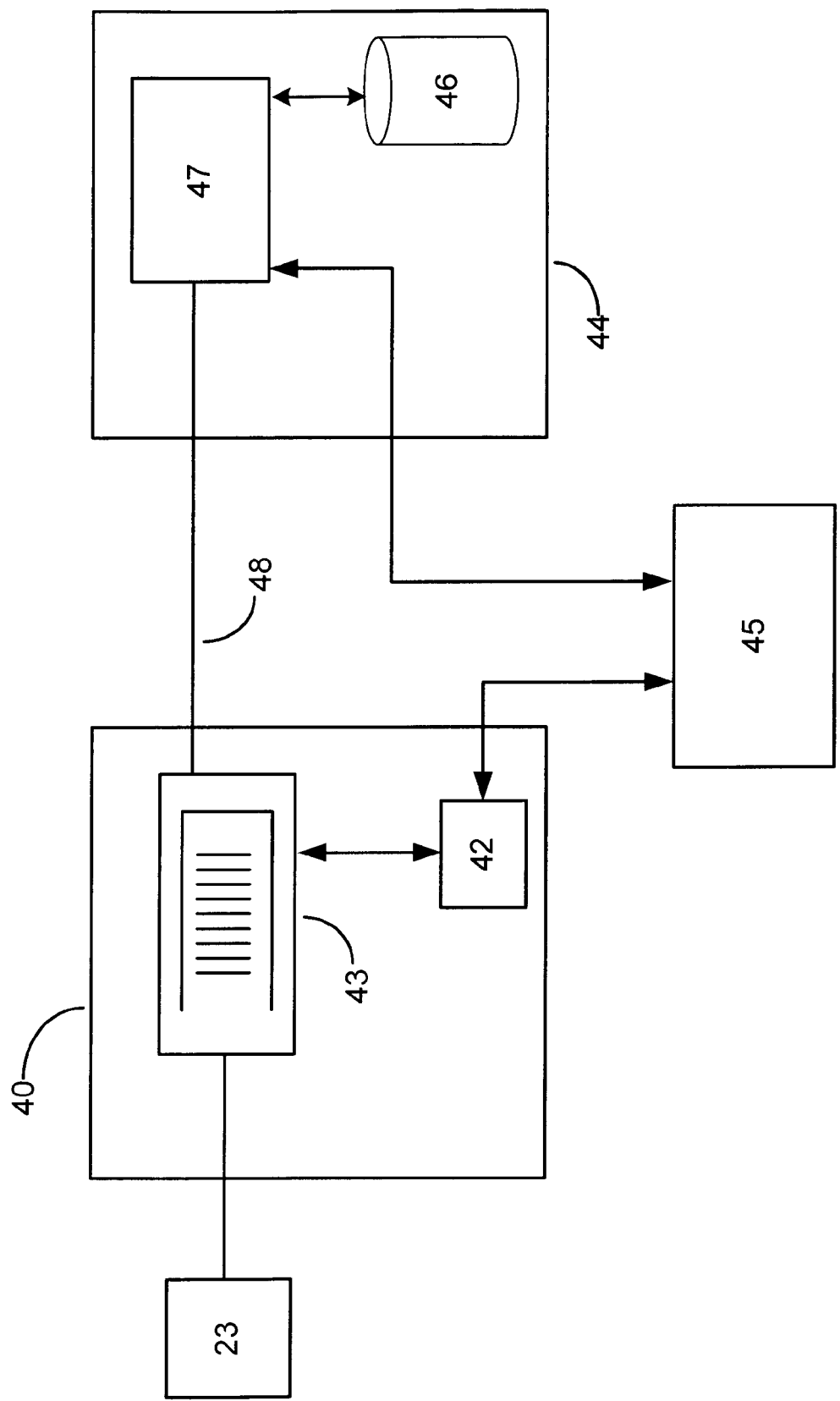
FIG. 4 is a block diagram of a secondary storage system according to the present invention.

FIG. 4 shows a schematic diagram of apparatus according to the present invention. The purpose of the equipment is to provide a permanent duplicate of the data stored on the primary storage system, which has been transmitted along the hitless switching system to the remote site.

A buffer system 40 is connected to the remote terminal of a hitless switching system, 23. The hitless switching system is utilised in a remote optical mirroring system, as it has an ability to effectively guarantee the arrival of data at the remote terminal.

An important advantage of the hitless switching scheme is that it allows a path to be chosen on a frame-by-frame basis in real time unlike conventional protection schemes which allow dribbling errors below a signal degrade threshold. This not only affords hitless protection switching but also offers very low end to end BER performance without utilising extra network resources. For example, consider a dedicated protection scheme with two distinct transmission paths operating at 2.5 GHz where the path level BER is between 1 in 1E12 ($1E12 \equiv 1 \times 10^{12}$) and 1 in 1E18. The number of bits per frame is 2.5 G/8000=312500. The probability of a frame error is therefore less than 1 in 1E12 by 312500 which is less than 1 in 1.32E6. Because the invention allows protection switching on a frame-by-frame basis, to calculate the output BER it is necessary to calculate the probability of having a simultaneous frame error on both paths (i.e. the square of the path frame error rate) which in this case is 1 in 1.024E13. For a 2.5 GHz signal, this corresponds to one error approximately every 40 years. Links introducing less than one error every 20 years (corresponding to a BER of approximately 1 in 0.5E13) can be considered to guarantee the correct arrival of data at the remote end of the link and are referred to as low bit error rate links. In the context of the present invention when data is guaranteed to arrive at the remote terminal no acknowledgement need be sent back to the transmission end of the link to state that the data has arrived correctly. Such a link, which guarantees the arrival of data, is therefore referred to as an acknowledgement free link.

The buffer system comprises a buffer controller 42 and a buffer memory 43. The hitless switch system guarantees that data emerging from the terminal 23 is correct, and so this data is immediately stored in the buffer, such that there is a permanent record of it. The data may be stored along with an ID number for that segment of data. As will be described later there are a number of possible numbering methods.

The remote storage system 44 consists of a storage device 46 and a storage controller 47. Typically the storage device consists of magnetic hard disks organised as Redundant Arrays of Independent Disks (RAIDs), although it will be appreciated that any kind of storage medium can be used.

A communications link 48 enables data to be communicated from the buffer system, typically co-located with the remote terminal of the hitless switch system, to the storage system, which may located some distance from the hitless switch terminal. For example the hitless switch may be located in a service provides exchange building, while the data store is located on the customers premises. The type of link will be defined in accordance with the distance from the buffer system to the storage system, and the capacity requirements.

The storage control system 47 is responsible for monitoring the status of writes to the disks and reporting back to the system controller 45 the success or failure of the writes. The system controller 45 is provided which is responsible for controlling the operation of the buffer system in response to the acknowledgements issued by the storage system 44. As will be discussed below the system controller may also be utilised to monitor the status of the system and to report back to the primary storage end of the hitless switch system with information as required.

Figure 5:
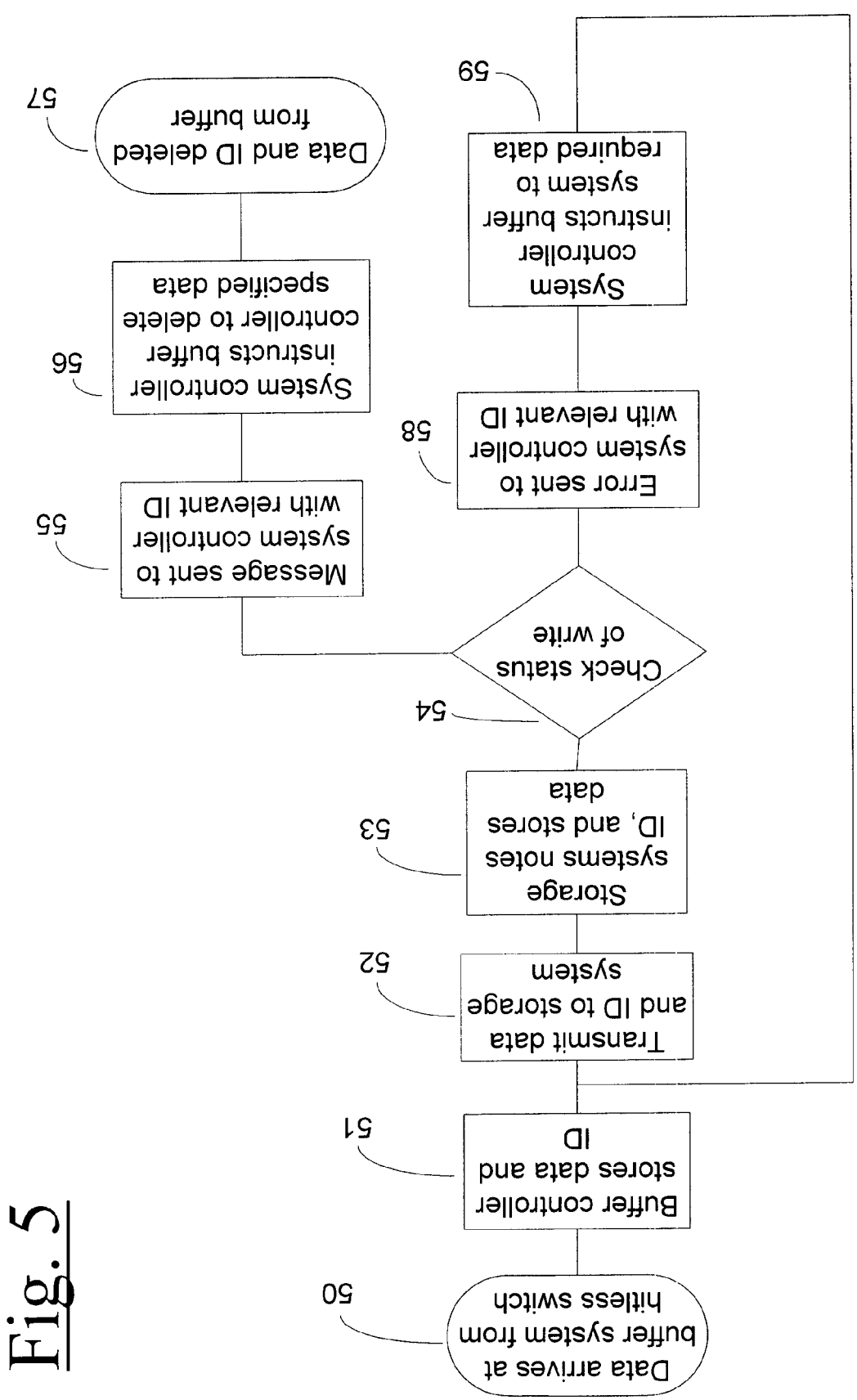
FIG. 5 is a flow chart of a method of data mirroring according to the present invention.

A method of operating the equipment will now be described with reference to FIGS. 4 and 5.

Data arrives at the buffer system 40 from the hitless switch system 23 at step 50. The buffer controller 41 stores the data in the buffer 43, along with an ID number identifying each segment of data, at step 51. The data and ID are sent to the storage system 44, step 52, where the storage system records the ID number and attempts to store the data, step 53. The storage system controller 47 monitors the status of the write, step 54, and once successful sends a message to the system controller 45, stating the ID number of the data that has been correctly stored, step 55. The system controller 45 instructs the buffer controller 42 that the data has been stored, by sending a write confirmation message, step 56, and the buffer controller 42 deletes the data and ID from the buffer 43, step 57.

Should the storage system 44 fail to store the data correctly, an error message is sent to the system controller 45 announcing this, step 58. The system controller 45 records the error and passes it to the buffer controller 42, which instructs the buffer 43 to re-send the data, step 59. This second transmission may be performed immediately, or may be performed at a later stage when there is no other activity occurring, to avoid conflict in the transmission paths. Data is only deleted from the buffer once an acknowledgement that it has been correctly stored is received. In this way it is guaranteed that all data emerging from the hitless switching system is correctly and accurately stored.

As discussed an ID number may be required to uniquely identify segments of data to be stored on the remote storage system. There are a number of possible methods of accomplishing this according to the present invention.

In a preferred embodiment the Virtual Concatenation frame numbering scheme is utilized to track and acknowledge frames in the storage system. Virtual Concatenation provides a standardized method whereby data can be framed into Virtual Containers, for transmission. Virtual Concatenation is described in ITU-T G.707/Y.1322 (10/00)) which is hereby incorporated herein by reference. Each Virtual Container, transmitted according to the Virtual Concatenation standard is given a frame ID number carried in the overhead. The frame ID is utilized by the hitless switching system to correctly align data at the remote terminal.

According to the present invention, the hitless switch receiver may be arranged to output the framed data, including the overhead. The frame ID contained in the overhead is utilized by the storage buffering system to identify and track each segment of data.

The buffer system reads the frame overhead, and stores the frame ID with the data in the buffer system. When the frame is forwarded to the storage system the frame ID is also forwarded and is utilized by the storage system to inform the controller which data has been written correctly, or which failed.

Transmission frames are defined as being of a fixed time period. The quantity of data within each frame is thus dependent upon the bit rate of the system. It may be desirable to acknowledge data on a larger or smaller granularity than that provided by the transmission frames, which is clearly not possible if the frame IDs are used. In a preferred embodiment the frame ID is not used to track the frames, and a further numbering scheme is employed to accomplish this.

The hitless switch receiver may be arranged to output only the data content of the frames, and not the overhead. As the buffer system receives data from the transmission system it is split into suitably sized segments and stored along with an ID number. Alternatively, the hitless switch may output the entire frame, including overhead, and the buffer system removes the overhead, re-segments the data and applies a new numbering scheme. The numbers employed by the buffer are utilized in the same way as the frame ID numbers, as described previously.

In a further embodiment, no numbering scheme is utilized by the buffered storage system. The frame overhead can be removed either in the hitless switching terminal or by the buffer system before the data is stored. The buffer is configured to store data as it arrives in a First-In, First-Out (FIFO) buffer system. The buffer transmits data to the storage system according to the usual FIFO rules, such that data arrives at the storage system in the order in which it is to be written. The buffer is configured to only output a defined quantity of data at a time, and to wait for confirmation that that data has been written before outputting the next segment of data. This has the advantage that no numbering scheme is required, since confirmations (or failures) always relate to the last piece of information transmitted.

Whilst this system is simpler than ones involving numbering schemes, it has the disadvantage that data must be written in the order in which it is received, and that latency is introduced as the buffer is waiting for the acknowledgement of the previous segment before transmitting the next one. This is particularly evident if the storage system is located remotely from the buffer system, and the transmission time is significant.

As has been discussed it is a feature of co-pending U.S. application Ser. No. 10/460,285 that the primary storage system assumes that data has arrived correctly at the remote terminal of the hitless switched transmission system. Whilst in normal operation this is acceptable due to the performance of the link, problems arise if there is a failure of the remote storage system.

In a further aspect of the present invention, the remote buffered storage system has a method of communicating back to the primary store to indicate that a problem has arisen.

If the remote storage system fails, the system controller will receive continuous error messages, or if only a partial failure occurs, a large number of error messages will be received. When error messages are received no data is deleted from the buffer system, and hence the buffer will rapidly fill with the data being received from the transmission link.

The system controller may be configured to send a signal to the primary storage location indicating that a problem has occurred, and that data transmission should cease. Since the remote site is located a long distance from the primary site, there will be a substantial delay between sending the signal and it arriving at the primary site. Thus data arrival at the remote site will not cease immediately, as there will be a significant amount of data already on the transmission system.

To avoid the buffer overflowing while the cease signal is propagating to the transmit end of the system, the signal must be sent sufficiently early such that the data in the transmission system does not cause the buffer to overflow. This system guarantees that no data is lost, as data in the buffer that has not been written can remain there indefinitely until the storage device is operational. Alternatively, once data flow has ceased the remote site can notify the primary site which data remains in the buffer, such that it can be stored at an alternative location.

Figure 6:
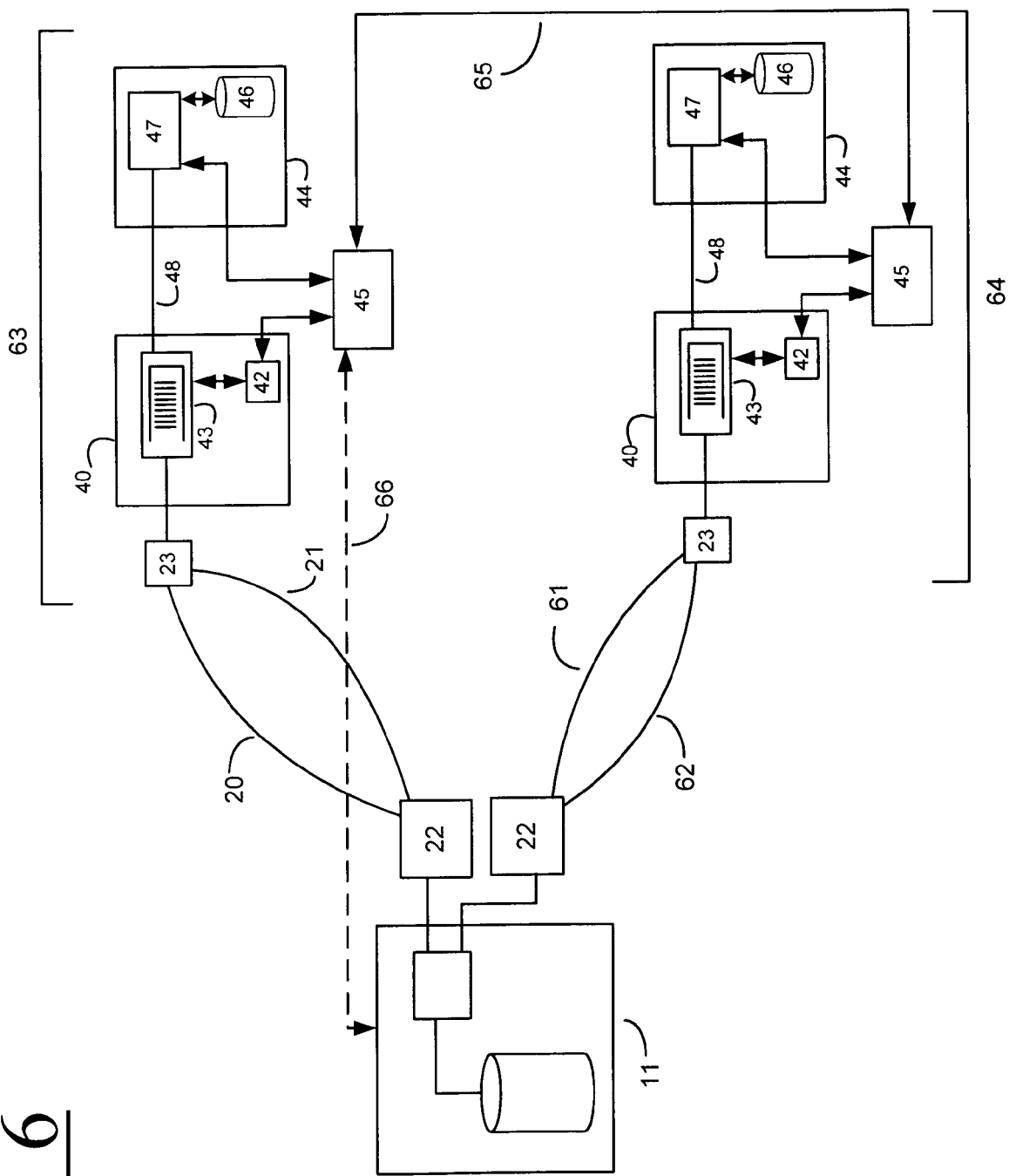
FIG. 6 is a block diagram of a mirroring system with multiple remote storage systems according to the present invention.

In order to further guarantee remote mirroring of data, two remote storage systems may be provided, operating independently and preferably separated geographically, as shown in FIG. 6.

The primary storage site, 10, is connected to two remote mirror sites, 63 and 64. Hitless switch connections, 20/21 and 61/62, are used for the connection, and thus we can guarantee that the data arrives at the remote terminals 23. Each remote mirror site operates as has previously been described to store the received data on the respective storage system.

A communications connection 65 may be provided between the systems controllers of the two remote mirror sites.

In a preferred embodiment one of the remote storage systems, 63 or 64, is defined to be the master system, and the other the slave system. The master system is responsible for maintaining a list of the data which has arrived at the remote locations. It may also record details such as the time of arrival, the time it was written to the storage system and the location of the data in the storage system. Each time the slave system correctly writes a section of data to its respective storage system, it sends a signal to the master system announcing this. The details are recorded in the master system's records. If the slave system fails to write a section of data, this is also communicated to the master system, and is recorded by the master system. If, at a later time, the slave system correctly writes the data it can send a write acknowledgement to correct the master systems record.

In this fashion the master system always has a correct record of the data that has been stored on each of the two storage systems. By comparison with the records of data received at the remote terminal the system can offer confirmation that all data is correctly stored. A further communications connection, 66, may also be provided between the master system controller and the primary storage system.

This communication connection can be utilized by the primary storage system to interrogate the remote storage system and monitor the status of the remote storage systems.

In an alternative embodiment, each system is equal, and sends acknowledgements to each other. If one of the systems fails to store the data correctly this is also sent to the other system. Both of the systems may keep records of failures, or the notices may be discarded once they have been processed. If a failure notice is received from the other system, a system may send the correct data over the link to the other system such that it may be stored correctly.

Due to the rarity of the need for acknowledgements over the link a negative acknowledgement system may be preferred. That is to say if no acknowledgement is received, it is assumed the data has been stored correctly—a message is only expected when a failure has occurred.

The invention claimed is:

1. Apparatus for receiving duplicate data transmitted without awaiting acknowledgement over redundant paths of a data transmission network and transmitting the data for storage on a storage device arranged to provide a write confirmation message, the apparatus comprising
   a hitless switch arranged to realign the duplicate data and select one of the duplicate data,
   a buffer; and
   a buffer controller connected to the storage device and the buffer,
wherein the buffer controller is arranged to store a copy of the selected data in the buffer; and
wherein the buffer controller is arranged to delete the copy of the selected data from the buffer only after a corresponding write confirmation message is received from the storage device.

2. Apparatus as claimed in claim 1, wherein the data transmission network comprises a link with a low bit error rate.

3. Apparatus as claimed in claim 1, wherein the redundant paths of the data transmission network comprises first and second diversely routed paths.

4. Apparatus as claimed in claim 1, wherein the data transmission network comprises an acknowledgement free link.

5. Apparatus as claimed in claim 1, wherein the storage device is located at a remote location from the buffer.

6. Apparatus as claimed in claim 1, wherein the copy of the data is re-transmitted to the storage device from the buffer in response to a retransmission request from the storage device.

7. Apparatus as claimed in claim 1, wherein the buffer stores an ID number with the copy of the data being stored in the buffer.

8. Apparatus as claimed in claim 7, wherein the ID number is transmitted to the storage device.

9. Apparatus as claimed in claim 7, wherein the ID number identifies which data to delete from the buffer.

10. Apparatus as claimed in claim 7, wherein the ID number identifies which data to retransmit from the buffer.

11. Apparatus as claimed in claim 1, comprising two buffers, two controllers and two separate storage devices.

12. Apparatus according to claim 11 further comprising a communications link from a first controller to a second controller.

13. Apparatus as claimed in claim 12 arranged to use the communications link to carry write confirmation messages from one controller to the other.

14. Apparatus as claimed in claim 12 arranged to use the communications link to carry write failure messages from one controller to the other.

15. Apparatus as claimed in claim 12 wherein the communications link is arranged to carry data lost messages from one controller to the other.

16. Apparatus as claimed in claim 15 wherein the communications link is arranged to carry a further copy of data, transmitted in response to a data lost message.

17. A method of receiving data transmitted without awaiting acknowledgement over redundant paths of a data transmission network and transmitting the data for storage on a storage device arranged to provide a write confirmation message, comprising the steps of using a hitless switch arranged to realign the duplicate data and select one of the duplicate data, storing a copy of the data in a buffer, transmitting the data to the storage device, and deleting the data from the buffer only after receiving a corresponding write confirmation message from the storage device.

18. A method according to claim 17 further comprising the steps of retransmitting the data in response to a retransmission request from the storage device.

19. A method according to claim 17 further comprising the step of storing an ID number in the buffer, corresponding to the copy of data being stored in the buffer.

20. A method according to claim 19 further comprising the step of transmitting the ID number to the storage device.

21. A method according to claim 19 further comprising the step of utilizing the ID number to identify which data to delete from the buffer.

22. A method according to claim 19 further comprising the step of utilizing the ID number to identify which data to retransmit from the buffer.

23. A method according to claim 17 further comprising the step of sending a signal to the data transmission network to stop sending data.

24. A method according to claim 17 further comprising the step of sending a message from a first storage device, which has stored the data correctly, to a second storage device, to indicate the data has been stored correctly.

25. A method according to claim 17 further comprising the step of sending a message from a first storage device, which has not stored the data correctly, to a second storage device to Indicate that the write has failed.

26. A method according to claim 17 further comprising the step of sending a message from a first storage device, which has lost the data, to a second storage device to indicate that the data has been lost.

27. A method according to claim 17 further comprising the step of sending the data from a storage device which has not lost the data, to a storage device that has lost the data.

* * * * *